United States Patent
Stotts, Jr. et al.

(10) Patent No.: US 7,982,751 B2
(45) Date of Patent: Jul. 19, 2011

(54) METHODS AND SYSTEMS FOR CONTROLLING A COMPUTER USING A VIDEO IMAGE AND FOR COMBINING THE VIDEO IMAGE WITH A COMPUTER DESKTOP

(75) Inventors: Paul David Stotts, Jr., Pittsboro, NC (US); Jason McColm Smith, Raleigh, NC (US)

(73) Assignee: The University of North Carolina, Chapel Hill, NC (US)

( * ) Notice: Subject to any disclaimer, the term of this patent is extended or adjusted under 35 U.S.C. 154(b) by 750 days.

(21) Appl. No.: 10/562,240

(22) PCT Filed: Jul. 9, 2004

(86) PCT No.: PCT/US2004/022268
§ 371 (c)(1),
(2), (4) Date: May 30, 2006

(87) PCT Pub. No.: WO2005/008626
PCT Pub. Date: Jan. 27, 2005

(65) Prior Publication Data
US 2006/0238548 A1    Oct. 26, 2006
US 2007/0222796 A2    Sep. 27, 2007

Related U.S. Application Data

(60) Provisional application No. 60/486,516, filed on Jul. 11, 2003.

(51) Int. Cl.
*G09G 5/00* (2006.01)
(52) U.S. Cl. .................... 345/633; 345/634; 345/630
(58) Field of Classification Search .................. None
See application file for complete search history.

(56) References Cited

U.S. PATENT DOCUMENTS

| | | | |
|---|---|---|---|
| 5,687,306 A | 11/1997 | Blank | |
| 6,140,994 A * | 10/2000 | Schaffstein et al. | 345/629 |
| 6,353,450 B1 * | 3/2002 | DeLeeuw | 715/768 |
| 6,370,487 B1 | 4/2002 | Dorough | |
| 7,278,107 B2 * | 10/2007 | Price | 715/753 |
| 2002/0097247 A1 * | 7/2002 | Ohba | 345/501 |
| 2003/0182358 A1 * | 9/2003 | Rowley et al. | 709/203 |
| 2010/0007764 A1 * | 1/2010 | Martins et al. | 348/222.1 |

OTHER PUBLICATIONS

International Search Report and the Written Opinion of the International Searching Authority in PCT Application No. PCT/US04/22268 (Nov. 15, 2004).
"1394 Technology," 1394 Trade Association: Technology, http://www.1394ta.org/Technology (Downloaded from the Internet on Feb. 17, 2010).
Caudle, "Seeing Eye to Eye: Facetop Puts Partners on the Same Page," Endeavors, p. 2 (Spring 2004).

(Continued)

*Primary Examiner* — Andrew Wang
*Assistant Examiner* — David H Chu
(74) *Attorney, Agent, or Firm* — Jenkins, Wilson, Taylor & Hunt, P.A.

(57) ABSTRACT

The methods described herein for controlling a computer using a video image and for combining the video image with a computer desktop may be implemented in hardware, software, firmware, or any combination thereof. In one exemplary implementation, the methods described herein may be implemented as computer executable instructions embodied in a computer readable medium. Exemplary computer-readable media suitable for use with the implementations described herein include disk storage devices and chip memory devices.

48 Claims, 6 Drawing Sheets

OTHER PUBLICATIONS

Stotts et al., "Single- and Duel-User Web Browsing in the Transparent Video Facetop," Technical Report TR04-005, Department of Computer Science, University of North Carolina at Chapel Hill (Dec. 1, 2003).

Stotts et al., "Automated Hyperlink Markup for Archived Video," Technical Report TR02-007, Department of Computer Science, University of North Carolina at Chapel Hill (Feb. 15, 2002).

Stotts et al., "Support for Distributed Pair Programming in the Transparent Video Facetop," Technical Report TR04-008, University of North Carolina at Chapel Hill (Mar. 15, 2004).

Sonnenwald, et al., "Evaluating a Scientific Collaboratory: Results of a Controlled Experiment," ACM Transaction on Computer-Human Interaction, vol. 10, No. 2, p. 150-176 (Jun. 2003).

Stotts et al., "Virtual Teaming: Experiments and Experiences with Distributed Pair Programming,"TR03-003, Department of Computer Science, University of North Carolina at Chapel Hill, p. 1-11 (Mar. 1, 2003).

Baheti et al., "Exploring Pair Programming in Distributed Object-Oriented Team Projects," Educator's Worksop, OOPSLA 2002, p. 1-6 (Nov. 4-8, 2002).

Teasley et al., "Rapid software Development through Team Collocation," Software Engineering, IEEE Transaction on Software Engineering, vol. 28, No. 7, p. 671-683 (Jul. 2002).

Stotts et al., "Semi-Automated Hyperlink Markup for Archived Video," Conference on Hypertext and Hypermedia, Proceedings of the Thirteenth ACM Conference on Hypertext and Hypermedia, p. 105-106 (May 2002).

Baheti et al., "Exploring the Efficacy of Distrubted Pair Programming," Proceedings of the Second XP Universe and First Agile Universe Conference on Extreme Programming and Agile Methods; Lecture Notes in Computer Science, vol. 2418, p. 208-220 (2002).

Bishop, G., "The Office of Real Soon Now," http://www.cs.unc.edu/~gb/office.htm (Oct. 8, 2001).

MIT, "Vision Interface Seminar," http://www.ai.mit.edu/~trevor/6.892/ (Fall 2001).

Nishi et al., "SnapLink: Interactive Object Registration and Recognition for Augmented Desk Interface," Conference on Human-Computer Interaction, p. 240-246 (Jul. 2001).

Laptev, et al., "Tracking of Multi-State Hand Models Using Particle Filtering and a Hierarchy of Multi-Scal Image Features," Proceeding of the IEEE Workshop on Scale-Space and Morphology, in Springer-Verlag LNCS 2106, p. 63-74 (Jul. 2001).

Olson et al., "Distance Matters," Human Computer Interaction, vol. 15, p. 139-179 (2001).

Wells, J.D., "Extreme Programming: A Gentle Introductions," http://www.extremeprogramming.org/ (2001).

Sonnenwald et al., "Using Innovation Diffusion Theory to Guide Collaboration Technology Evaluation: Work in Progress," IEEE 10th International Workshop on Engabling Technologies: Infrastructure for Collaborative Enterprises (2001).

Traub, J., "This Campus is Being Simulated," in the New York Times Magazine, p. 88-93 (Nov. 19, 2000).

Fuchs, H., "The Office of the Future," http://www.cs.unc.edu/~raskar/Office/ (Aug. 24, 2000).

Bishop et al., "Working in the Office of 'Real Soon Now,'" IEEE Computer Graphics and Application, p. 76-78 (Jul./Aug. 2000).

Smith et al., "An Orthogonal Taxonomy for Hyperlink Anchor Generation in Video Streams Using OvalTine," Conference on Hypertext and Hypermedia, Proceedings of the eleventh ACM on Hypertext and Hypermedia, p. 11-18 (May 2000).

ITAC, "Telecommuting (or Telework): Alive and Well or Fading Away?" : International Telework Association and Council, http://www.telecommute.org (Copyright 2000).

MIT, "DataWall: Seamless, Full Motion, Ultra High Resolution Projection Display," http://vlw.www.media.mit.edu/groups/vlw/DataWall-overview.htm, (2000).

Cockburn et al., "The costs and Benefits of Pair Programming," eXtreme Programming and Flexible Processes in Software Engineering—XP2000 (2000).

Beck, K., Extreme Programming Explained, Addison-Wesley, 2000.

Beck et al., "Junit a Cook's Tour," Java Report, vol. 4, No. 5, http://JUnit.sourceforge.net/doc/cookstour/cookstour.htm (May 1999).

Birchfield, S., "Elliptical head Tracking using Intensity Gradients and Color Histograms," implementation code at URL http://vision.stanford.edu/~birch/headtracker/ (Jan. 28, 1999).

Jones, D., "What is a CAVE TM?" http://www.sv.vt.edu/future/vt-cave/whatis/, (1999).

Fowler, M., Refactoring: Improving the Design of Existing Code, Addison-Wesley, 1999.

Beck et al., "Junit Test Infected: Programmers Love Writing Tests," Java Report, vol. 3, No. 7, http://JUnit.sourceforge.net/doc/testinfected/testing.htm (Jul. 1998).

Birchfield, S., "Elliptical Head Tracking Using Intesity Gradients and Color Histograms," Proceedings of the IEEE Computer Society Conference on Computer Vision and Pattern Recognition, p. 232-237 (Jun. 1998).

The University of Minnesota, "Welcome to the PowerWall," http://www.lcse.umn.edu/research/powerwall/powerwall.html (1998).

Bretzner, et al., "Use Your Hand as a 3-D Mouse, or, Relative Orientation From Extended Sequences of Sparse Point and Line Correspondences Using the Affine Trifocal Tensor," Lecture Notes in Computer Science, vol. 1406, p. 141-157 (Copyright 1998).

Capps et al., "Enhanced Graph Models in the Web: Multi-Client, Multi-Head, Multi-Tail Browsing," Computer Networks and ISDN Systems, vol. 28, p. 1105-1112 (1996).

Plowman, et al., "What are Workplace Studies for?" Proceedings of the Fourth European Conference on Computer-Supported Cooperative Work, p. 309-324 (Sep. 10-14, 1995).

Bier et al., "A Taxonomy of See-Through Tools: The Video," Conference on Human Factors in Comuting Systems, Conference Companion on Human Factors in Computer Systems, p. 411-412 (1995).

Benford et al., "User Embodiment in Collaborative Virutal Environments," Proceedings of Chicago 1995, http://www.acm.org/sigchi/chi95/electronic/documnts/papers/sdb_bdy.htm (1995).

Harrison et al., "Transparent Layered User Interfaces: An Evaluation of a Display Design to Enhance Focused and Divided Attention," Proceedings of Chicago 1995, http://www.acm.org/sigchi/chi95/Electronic/documnts/papers/blh_bdy.htm (1995).

Ishii et al., "Integration of Inter-Personal Space and Shared Workspace: ClearBoard Design and Experiments," Proceedings of ACM Conference on Computer Supported Cooperative Work, p. 33-42 (Nov. 1992).

Takemura et al., "Cooperative Work Environment Using Virtual Workspace," Computer Supported Cooperative Work, Proceedings of the 1992 ACM Conference on Computer-Supported Cooperative Work, p. 226-232 (1992).

Brothers et al., "ICICLE: Groupware for Code Inspection," Computer Supported Cooperative Work, Proceedings of the 1990 ACM Conference on Computer-Supported Cooperative Work, pp. 169-181 (1990).

Fish et al., "The Video Window System in Informal Communication," Computer Supported Cooperative Work, Proceedings of the 1990 ACM Conference on Computer-Supported Cooperative Work, p. 1-11 (1990).

Stotts et al., "Petri Net Based Hypertext: Document Structure with Browsing Semantics," ACM Transactions on Information Systems (TOUS), vol. 7, No. 1, p. 3-29 (Jan. 1989).

Conklin et al., "gIBIS: A Hypertext Tool for Team Design Deliberation," Proceedings of ACM Hypertext 1987, p. 247-251 (1987).

Engelbart et al., "A Research Center for Augmenting Human Intellect," AFIPS Joint Computer Conferences Proceedings of the Fall Joint Computer Conference, Part 1, (Dec. 9-11, 1968).

Essentialreality.com, P5 Glove, http:essentialreality.com/p5_glove.asp (Downloaded from the Internet on Feb. 22, 2010) (Publication Date Unknown).

\* cited by examiner

METHODS AND SYSTEMS FOR CONTROLLING A COMPUTER USING A VIDEO IMAGE AND FOR COMBINING THE VIDEO IMAGE WITH A COMPUTER DESKTOP

RELATED APPLICATIONS

This application claims the benefit of U.S. Provisional Patent Application Ser. No. 60/486,516, filed Jul. 11, 2003, the disclosure of which is incorporated herein by reference in its entirety.

GOVERNMENT INTEREST

This invention was made with Government support under Grant No. R82-795901-3 awarded by the U.S. Environmental Protection Agency. The Government has certain rights in the invention.

TECHNICAL FIELD

The present disclosure relates to methods and systems for combining images of computer users with computer interfaces. More particularly, the present disclosure provides methods and systems for controlling a computer using a video image and for combining the video image with a computer desktop.

BACKGROUND ART

In recent years, there has been increasing emphasis on developing teleworking applications and the supporting infrastructure. Teleworking generally includes telecommuting (the ability of an employee to work from home) and distance education.

The benefits of telecommuting can be felt in both urban and rural areas. Telecommuters in urban areas can avoid commuting to the office each workday, thereby reducing stress on the employee, increasing the amount of time available for work, and reducing automobile emissions. In rural areas, employees can work for employers located in urban areas without needing to commute or relocate. Rural areas reap the economic benefits of having a higher-paid workforce without the burden of building and maintaining a transportation infrastructure. Distance education provides similar benefits by permitting students to have some flexibility in course scheduling and providing rural areas access to educational resources.

Where teleworking applications fall short is in their support for collaborative development efforts. For example, recent trends in software development involve paired programming, where programmers work side-by-side at the same computer terminal developing the same portion of code. Programmers working in pairs are believed to produce more lines of code with fewer errors than programmers working alone. Paired programming involves a high level of verbal and non-verbal interaction between the programmers. Many existing teleworking applications support some level of interaction between participants, but typically require participants to divide their attention between different portions of a display device to view the person speaking and the subject matter being discussed. In some cases, special networking hardware is required. In addition, control of a single pointing device is often shared between collaborating users, which can impede the flow of communication since one user may need to surrender control of the pointing device to permit the other user to visually indicate the subject being discussed. Thus, existing computer interfaces that sectionalize a computer display between video images of users and the application being discussed are unsuitable for paired programming.

Another area in which existing computer interfaces fall short is education. Computer-based presentations are becoming increasingly common, both in business settings and educational settings. During a presentation, the presenter may wish to visually refer to a portion of a presentation slide, typically using a pointer stick or laser pointer. To align the pointer with the desired object on the computer interface, the presenter may need to move away from the computer being used to control the presentation slides and then back to advance the presentation to the next slide. The back and forth movement of the presenter may be distracting to the viewers and may interrupt the flow of the presentation. The members of the audience may have to divide their attention between the slide being presented and the presenter, which may detract from the quality of the presentation. In addition, depending on the size and position of the display, the presenter may not be able to satisfactorily indicate the portion of the presentation slide being referenced.

Accordingly, there is a need to provide methods and systems for controlling a computer using a video image and for combining the video image with a displayed computer desktop image.

SUMMARY

In accordance with one aspect of the present disclosure, a method for controlling a computer using a video image is provided. According to this method, a video stream is captured. The video stream is made up of a plurality of video frames. At least some of the video frames are analyzed to determine a location of an object. The location of the object may be used to control one or more programs being executed by the computer. The video stream is combined with a user interface stream generated by the computer operating system, thereby forming a composite video stream. The composite video stream is displayed using a display device.

In accordance with another aspect of the present disclosure, a method for combining a video image of a user with a computer desktop interface is provided. According to this method, a video stream containing a live image of a computer user is captured. The video stream is transparently combined with an image of a computer desktop. The combined image is then displayed. The combined image includes a transparent or partially transparent image of the user and an image of the computer desktop. The user can indicate objects on the desktop to a viewer of the display using the user's image on the desktop.

As used herein, the terms "desktop" and "desktop interface" are intended to refer to a graphical user interface that allows control of programs executing on the computer. Neither of these terms is intended to be limited to a specific computer operating system.

The methods described herein for controlling a computer using a video image and for combining the video image with a computer desktop may be implemented in hardware, software, firmware, or any combination thereof. In one exemplary implementation, the methods described herein may be implemented as computer executable instructions embodied in a computer readable medium. Exemplary computer-readable media suitable for use with the implementations described herein include disk storage devices, chip memory devices, and downloadable electrical signals that carry computer-executable instructions.

DETAILED DESCRIPTION

Figure 1:
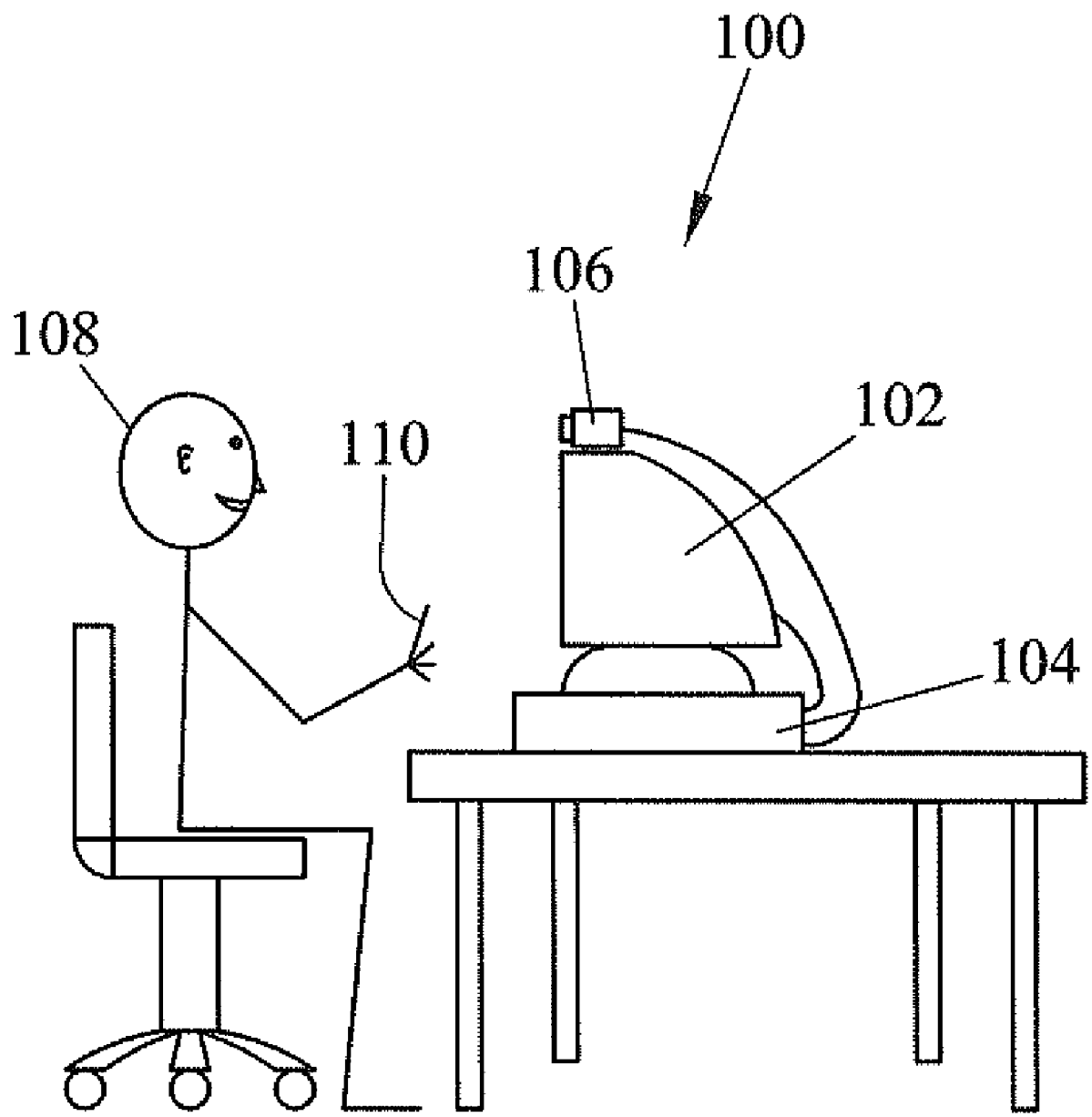
FIG. 1 is a block diagram illustrating an exemplary personal computer system that may be used to implement one embodiment of the present disclosure.

The present disclosure provides systems and methods for creating a novel user interface that supports not only single-user interactions with a personal computer, but also close pair collaboration, such as that found in distributed pair programming. In one implementation, the methods and systems may be implemented using a personal computer. FIG. 1 is a block diagram illustrating an exemplary personal computer system that may be used to implement the invention. Personal computer 100 includes a display device 102, console 104, and camera 106. A variety of suitable display devices 102 may be used, including a cathode ray tube (CRT) display, a liquid crystal display, or a projection display. Display device 102 does not require any particular display resolution or color capabilities in order to implement the methods and systems described herein.

Console 104 may be of any commercially available or custom architecture and may be based on a variety of microprocessor architectures, including an Intel-style processor, a Motorola-style processor, MIPS, and others. Console 104 may include supporting memory, such as RAM and ROM, and storage devices, including magnetic disk drives and optical drives. Console 104 may also include an operating system that provides interface functionality between software applications and the underlying hardware. In one implementation, an Apple Macintosh running MacOS X 10.2 was used.

Console 104 may also include interface hardware, such as a graphics interface card, to support display device 102. The graphics interface card preferably provides standard 3D graphics capabilities and may interface with application software using the OpenGL standard. In one implementation, an nVidia GeForce4 graphics interface card was used. One feature that is preferably provided by the graphics card is the ability to transparently combine images. This feature will be described in further detail below.

Camera 106 interfaces to console 104 using a suitable high speed interface, such as IEEE 1394, also referred to as FireWire. Camera 106 is preferably capable of providing a video signal at 30 frames per second for best performance. Stored video, such as from a digital versatile disk (DVD), may be used to produce a video stream in place of or in addition to the camera 106. In one implementation, an OrangeMicro iBot camera was used to produce color video images of user 108 at 30 frames per second with a resolution of 640 pixels by 480 pixels.

Although the embodiment illustrated in FIG. 1 includes a single camera, the present disclosure is not limited to using a single camera to capture video images of the user or the user's environment. In an alternate implementation, multiple cameras may be used. For example, one camera may be trained on the user and the other camera may be trained on a whiteboard in the user's office. In such an implementation, the image of the user and the image of the whiteboard may be combined with the desktop image and sent to a remote user so that the remote user can see the local user, the local user's desktop, and the whiteboard.

As shown in FIG. 1, camera 106 is placed in proximity to display device 102 and is directed toward user 108. As described in greater detail below, display device 102 displays a composite image of the computer desktop and a video stream of user 108 generated by camera 106. In one exemplary implementation, the image of user 108 appears on display device 102 as if the user is viewing the desktop from behind. By placing camera 106 in front of the user 108, the user 108 is able to easily self-register an image the user's finger 110 with a desired location on the screen. That is, because the image of user 108 appears to be behind the desktop and camera 106 is located in front of user 108, when user 108 points to an object on the desktop, the user's image points at the same object. This alignment of camera 106, user 108, the user image, and the desktop image has been found to be very convenient for collaborative applications, such as paired programming, where two users are viewing text or objects on the same desktop.

In addition to the display aspect, the present disclosure may also include a control aspect. For example, user 108 may make predetermined movements of finger 110 to control one or more programs executing on computer 100. In one implementation, the user may train computer 100 to recognize certain movements as mouse clicks or other events to allow user 108 to interact with application programs.

Figure 2:
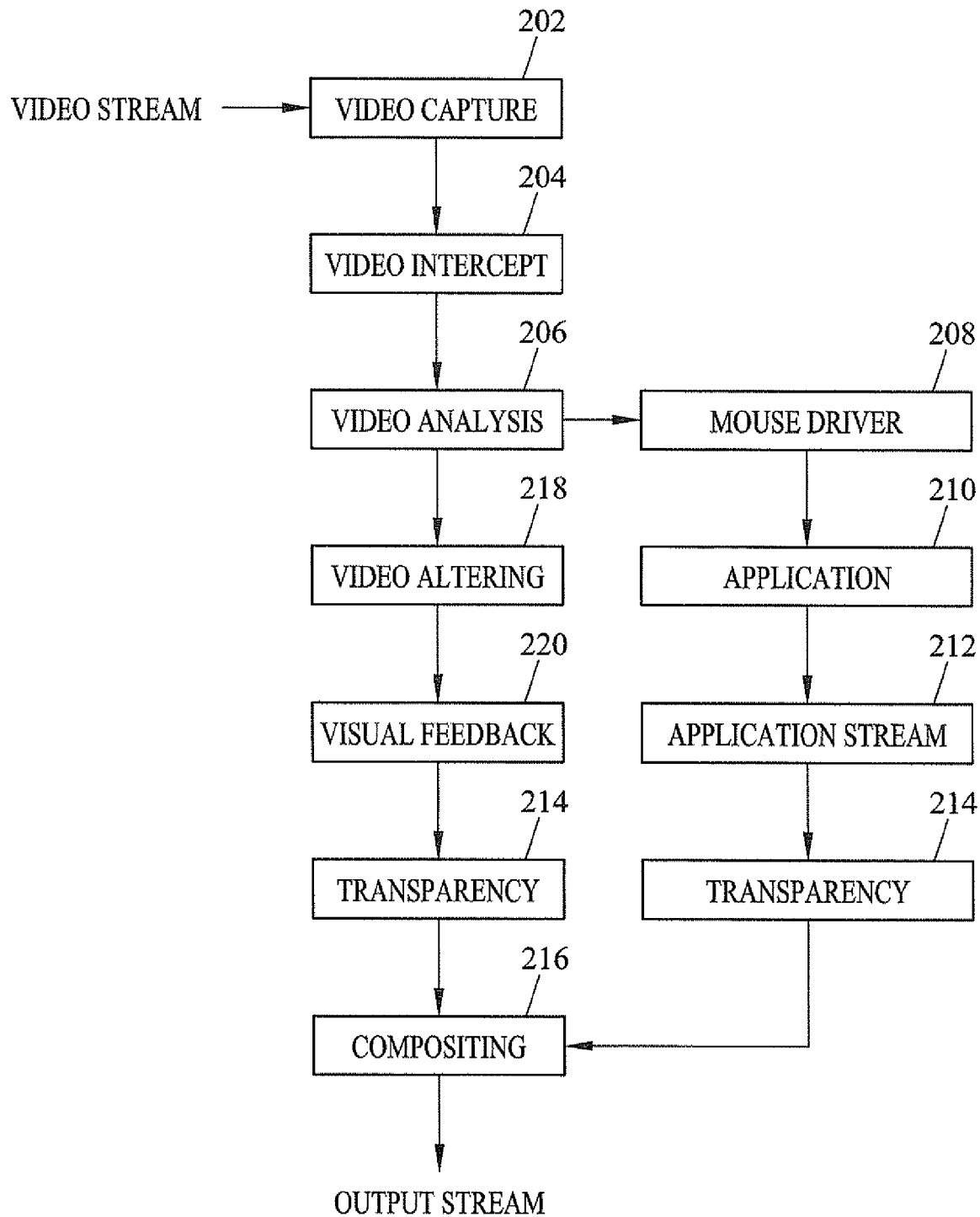
FIG. 2 is a block diagram illustrating an exemplary method for controlling a computer using a video image and for combining the video image with a computer desktop according to an embodiment of the present disclosure.

FIG. 2 is a block diagram illustrating an exemplary method of providing the user interface in accordance with one aspect of the present disclosure. The method may be implemented as an application running on computer 100 or may be integrated into the operating system. Referring to FIG. 2, camera 106 generates a video stream which is used as an input to video capture process 202. Video capture process 202 may provide various options for handling the incoming video stream, such as displaying the incoming video stream on display device 102, storing the video stream on one of the storage devices included in console 104, and/or forwarding the video stream to video intercept process 204. Video intercept process 204 provides an interface to other processes and applications to permit real time processing of the video stream. In an embodiment of the invention, video intercept process 204 receives the incoming video stream from video capture process 202.

In accordance with one aspect of the disclosure, video intercept process 204 forwards the video stream to a custom video analysis process 206. The video analysis process 206 provides analysis techniques to extract the position of objects in the video frame. In particular, the coordinates of an object of interest, such as a user's fingertip, are determined and passed to the user interface of the computer, shown in FIG. 2 as the mouse driver process 208. In order to facilitate recognition of the user's fingertip, the user may wear a thimble of a predetermined color that preferably does not occur frequently in nature. In one exemplary implementation, the thimble may be a fluorescent red color.

The coordinates of the object of interest may be determined by converting each frame of the video stream into a two-color image by applying a filter. The filter may pass a specific color and block others. The resulting image shows a concentration of pixels corresponding to the location of the object of interest. If the image contains more than one concentration of pixels, the largest concentration of pixels closest to the previous location of the object of interest may be selected to be the object of interest. The center of the concentration is determined and used as the location of the object of interest.

Other algorithms for object detection and tracking may be used in video analysis process 206, such as edge detection or motion detection. An example algorithm for edge detection uses image analysis to determine the gradient of a greyscale colorspace image to find the most likely edges of objects. An object may then be searched for by looking for particular shapes or sizes of objects and thereby determining their placement in the image.

Motion detection algorithms detect objects in motion in a video stream by detecting differences between two subsequent video frames. The areas of difference correspond to objects in the video field of view that have moved. In a system such as the video analysis process 206, this can be used to find frequently moving objects, such as fingertips or other object of interest that a user is using to direct the video, against a nominally non-moving background. Other approaches in video analysis process 206 may combine algorithms into new discovery techniques, such as using color filtering to provide a sample set of possible objects of interest and edge detection to further refine the set into the specific objects requested.

The location of the object of interest is passed to the mouse driver process 208, for example as a coordinate pair. The mouse driver process 208 translates the coordinate pair into a format understandable by the application 210. It should be appreciated that the term "mouse" is used generically to describe a user input device and may include other user input devices, such as a trackball, joystick, or tablet. In FIG. 2, mouse driver process 208 passes information about control events, such as "click" events and "drag" events, to application 210. In one exemplary implementation, a mouse click event may be indicated by the disappearance and re-appearance of the thimble within a predetermined time period. In order to initiate the event, the users may cover then uncover the thimble. Audio cues or commands may also be used to initiate and/or terminate a control event. Other events may be defined by the user using mouse gesture definition software, such as Cocoa Gestures available for the Apple Macintosh platform.

Application 210 may be the computer operating system or an application running on the computer. Based on the type of mouse events reported to the application 210, the application 210 may update or change the information that is displayed on computer display device 102. For example, a window containing an application may be opened, closed, or resized and this change is displayed on display device 102. Application 210 may forward the updated display information to application stream process 212. Application stream process 212 may be provided as part of the computer operating system to provide a uniform interface for an application to update its appearance on the computer display 102. Application stream process 212 acts as an input to the transparency process 214, which may alter properties of the application stream. The output from transparency process 214 is forwarded to the compositing process 216.

Video analysis process 206 forwards the intercepted video stream to video altering process 218. Video altering process 218 may incorporate various real time filters and effects to manipulate the video stream. For example, an animated overlay layer may be added to the video stream to mark-up archived content. An edge detection filter may also be used to create a minimally intrusive line-drawing effect for the feedback video, which may influence the level of transparency of the video stream that is set by transparency process 214. Video altering process 218 forwards the altered video stream to the visual feedback process 220. Visual feedback process 220 may perform additional image manipulations to provide feedback to the user with regard to the position of the pointer. The manipulations may include horizontally reversing the images of the video stream to produce a mirror image to provide meaningful feedback to the user concerning the location of his hand relative to the desired pointer location on the desktop. The altered video stream is forwarded to transparency process 214, which may change the display properties of the video stream. The video stream is made up of a series of video frames and an alpha channel. The value of the alpha channel determines the level of transparency of the video frame images. The OpenGL standard provides an interface for changing, among other things, the alpha channel of the video stream. Transparency process 214 forwards the video stream to compositing process 216.

Compositing process 216 combines the video stream and the application stream into a single output stream which is displayed on display device 102. Compositing process 216 takes advantage of the powerful image process capabilities of 3D graphics interface cards. The video stream and the application stream images are combined to form a single video stream that is forwarded to the screen buffer and displayed on display device 102 for viewing by the user. The transparency of each stream, which is set by the respective transparency process 214, determines the level of opacity of each stream.

Figure 3:
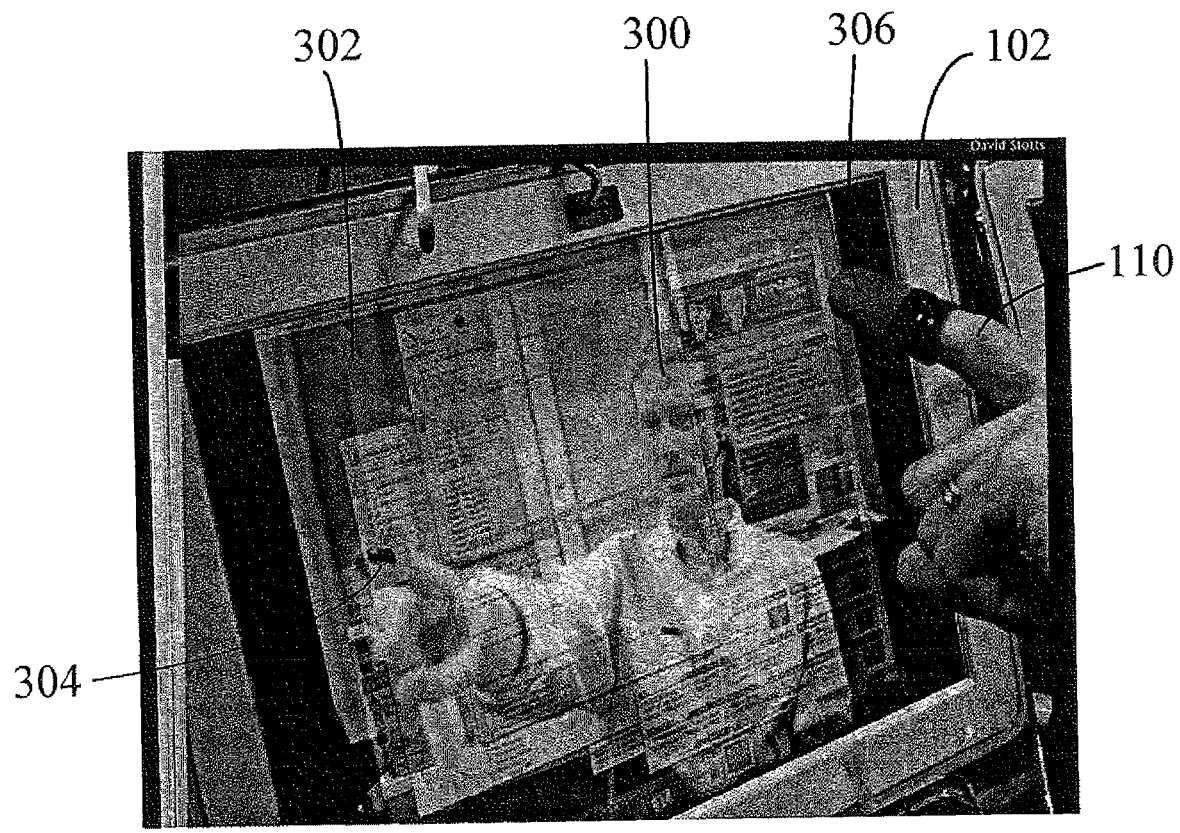
FIG. 3 is a diagram of an exemplary composited image displayed on a user display device in accordance with the present disclosure.

FIG. 3 is a diagram of an exemplary composite image displayed on a user display device 102 in accordance with the present disclosure. In this example, the video stream of image 300 appears as a reflection of user 108 on display device 102 and does not obscure the view of application desktop 302 of the computer. User 108 may control interface pointer 304 by moving his finger 110 to the desired location on the screen. The user's image on the screen enhances the visual feedback to the pointer's location and allows the user to naturally correct for spatial offsets, for example due to the camera angle or location, without a formal camera registration process. While controlling the location of interface pointer 304, user 108 may focus his attention on the composite image displayed on display device 102. As user 108 moves his finger 110 to point to the desired location on the desktop, user 108 observes the corresponding movement of the interface pointer 304. If interface pointer 304 is not at the desired location, user 108 may adjust the position of his finger 110 until interface pointer 304 is at the desired location. This self-registration process permits the user to change his location with respect to the camera and still control the location of interface pointer 304. Thus, user 108 is not tied to a particular location with respect to the camera in order to control the user interface.

FIG. 3 shows interface pointer 304 displayed in a diagnostic mode. The area around the point of interest, in this case the image of the user's finger 110, is displayed as a two-color image. The dark portion of the image corresponds to the location of colored thimble 306 worn on the user's finger 110. As previously discussed, the coordinates of thimble 306 on the desktop may be determined by filtering the image and determining a location of a concentration of pixels that correspond to the location of the point of interest. In FIG. 3, the concentration of pixels corresponds to the location of thimble 306. The center of the concentration of pixels is determined and used as the location of the point of interest, and the desktop pointer would be moved to that location.

Figure 4:
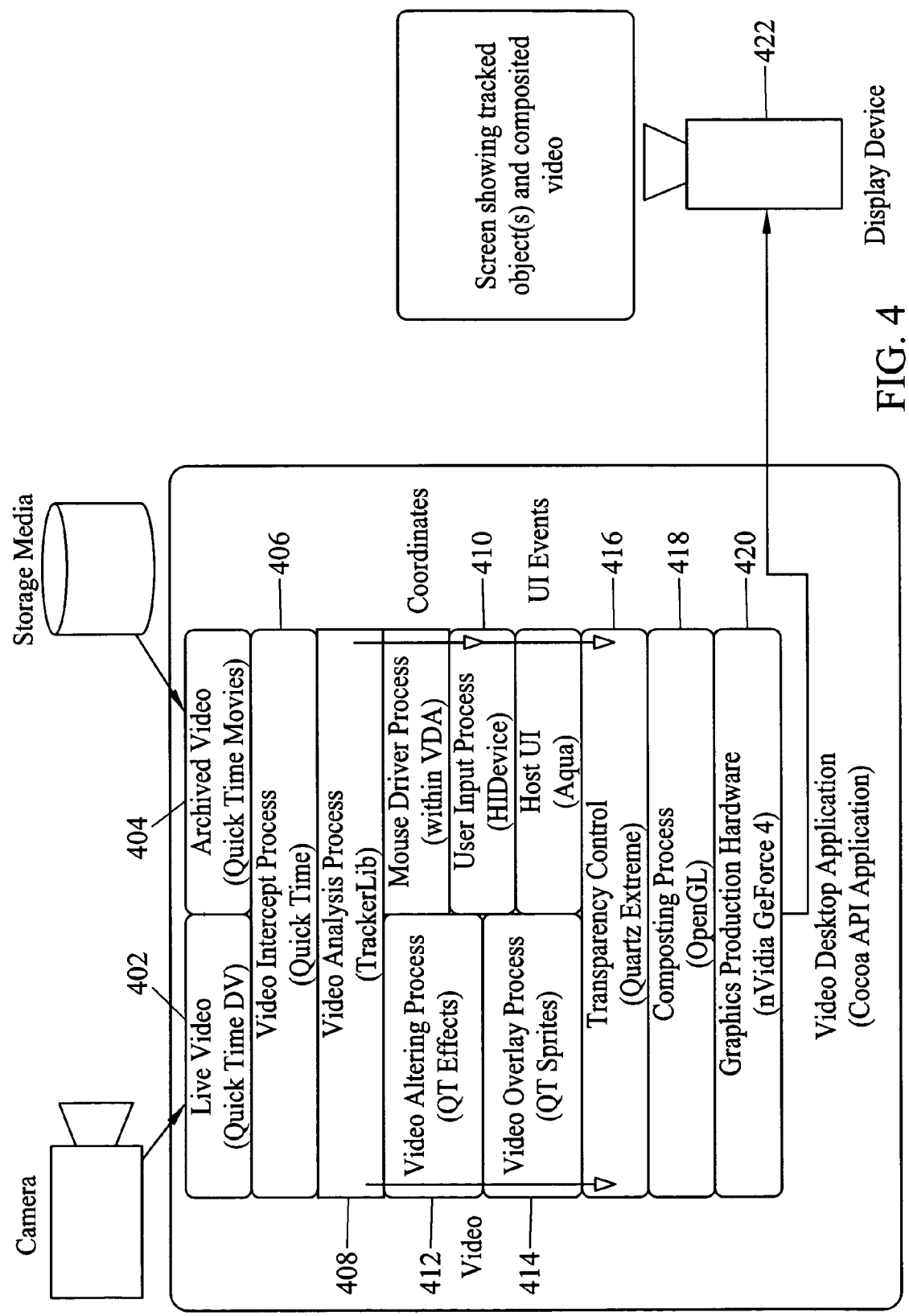
FIG. 4 is a block diagram of an exemplary software architecture of a system for combining the video image with a computer desktop according to an embodiment of the present disclosure.

FIG. 4 is a block diagram of the software architecture in accordance with one embodiment of the present disclosure. The embodiment described with reference to FIG. 4 is based on MacOS X operating system. However, it should be emphasized that the present disclosure is not limited to any particular computer operating system or hardware platform.

Referring to FIG. 4, live video (e.g., QuickTime™ digital video) 402 or archived video files 404 are used to produce a video stream. On Apple platforms, QuickTime™ intercepts and allows applications to handle the video stream in the same manner regardless of the source. In addition, QuickTime™ provides a well-defined and powerful application programming interface (API), referred to as the QuickTime™ Effects layer 406, that permits the processing of the video stream by user-defined processes.

In accordance with one aspect of the present disclosure, a custom video analysis routine, TrackerLib 408, is implemented as a QuickTime™ API application. TrackerLib 408 provides analysis techniques to extract positions of objects in the video frame. In particular, the coordinates of the user's fingertip are determined and passed to the user interface (UI) of the computer, thereby acting like a human interface (HI) device. The output of TrackerLib 408 is processed by the HI device layer 410 in a manner similar to a traditional external input device, such as a mouse or trackball. As described above, "click" events may be generated by gestures of the user, for example by temporarily obscuring the user's fingertip. In one embodiment, obscuring the user's fingertip for less than 0.5 seconds may be interpreted by TrackerLib as a "single click". Obscuring the user's fingertip for more than 0.5 seconds but less than 1 second may be interpreted as a "double click". Drag events, which involve clicking on an object and dragging it from a first location on the desktop to a second location, may be generated by obscuring the user's fingertip, moving the fingertip from a first location to a second location, and un-obscuring the fingertip. The first and second locations are the endpoints of the drag event.

TrackerLib 408 uses positional and object boundary information to alter the video stream for visual feedback to the user. In the present embodiment, various real-time filters and effects 412 native to the operating system are used to perform the desired image manipulations. For example, QuickTime™ Sprites 414 may be used to mark-up archived content. Sprites are an animated overlay layer that may be used for per-object visual tracking feedback and may respond to various mouse events. Edge detection filters may be used to create a minimally intrusive line-drawing effect for the feedback video.

The Quartz Extreme layer 416 combines the video and UI streams into a series of OpenGL 418 textures with appropriate alpha channels. The textures are composited by the accelerated video hardware's 420 3D OpenGL pipeline and sent to the display device 422. It should be appreciated that applications other than Quartz Extreme and OpenGL may be used to provide transparency control of the video streams.

Figure 5:
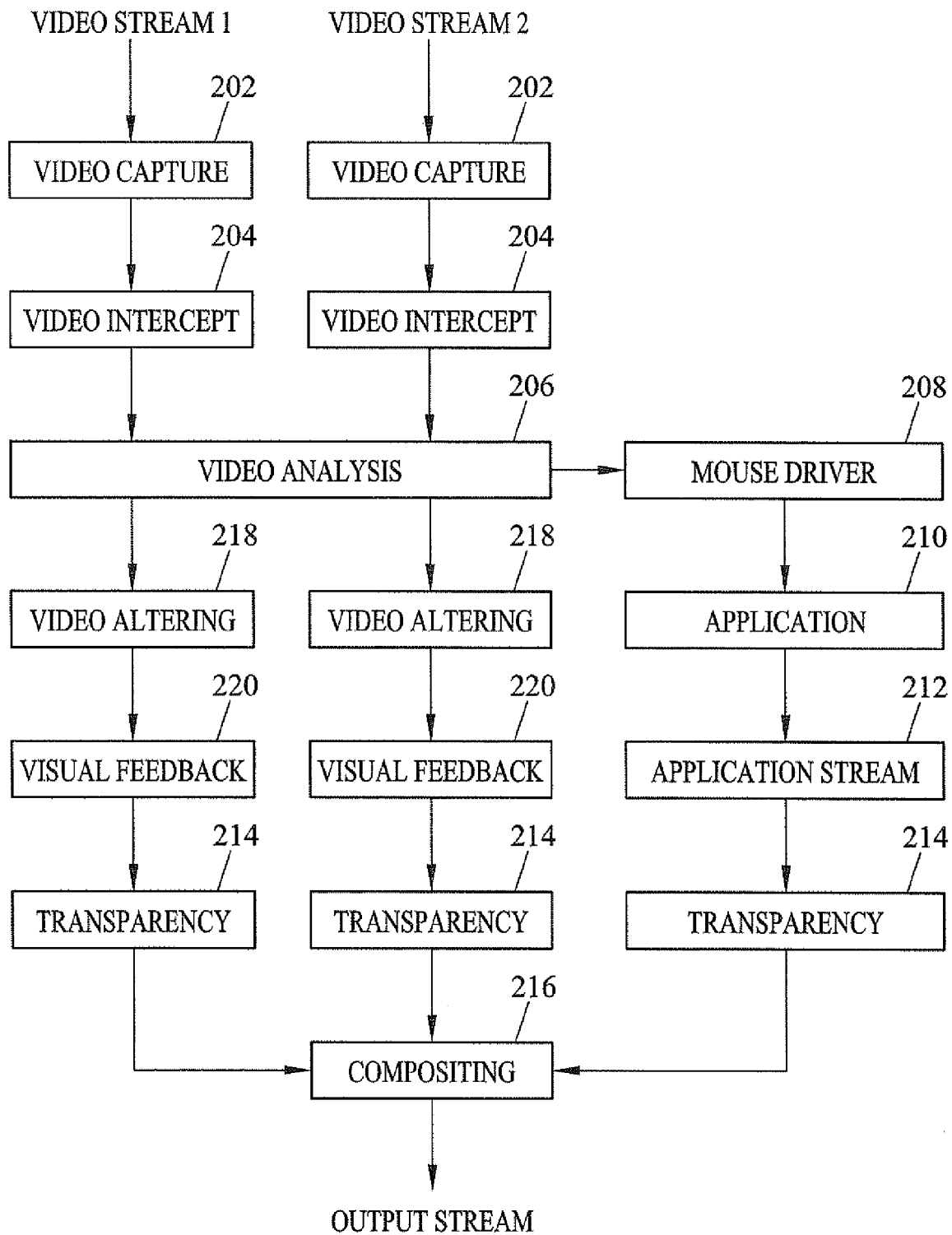
FIG. 5 is a block diagram illustrating an exemplary method for combining two video images with a computer desktop according to an embodiment of the present disclosure.

In the examples described above, a single video stream is combined with a desktop application stream and composited to form an output stream that is displayed by a display device. It should be appreciated, however, that the method described in FIGS. 2 and 4 may be expanded to include multiple input video streams. FIG. 5 is a block diagram of an exemplary method of providing a computer user interface using two input video streams in accordance with another aspect of the present invention. The methods shown in FIG. 5 have been described above with respect to FIG. 2. As such, a description of the methods need not be repeated herein. Each video stream is handled by a respective video capture process 202 and video intercept process 204. In a shared application, TrackerLib process 206 may be modified to examine each video input stream to determine which stream contains information used to determine the location of the mouse pointer. The location of the point of interest is passed to the mouse driver process 208, which may result in changes to the application state and application stream as described above. TrackerLib process 206 forwards each video stream to its respective video altering process 218, visual feedback process 220, and transparency process 214. Compositing process 216 combines the application stream and each video stream to produce a single output stream that is displayed on the display device. It should be appreciated that the method shown in FIG. 5 may be expanded to include additional video input streams by adding the respective processing blocks.

Collaborative desktop applications currently exist that permit multiple users to control their own mouse pointer on a shared desktop. To accommodate such applications, the method depicted in FIG. 5 may be modified such that the TrackerLib process 206 produces a mouse pointer output for each video stream. This may be accomplished by executing an instance of the TrackerLib process 206 for each video stream and the respective pointer location information forwarded to the collaborative desktop application.

Figure 6:
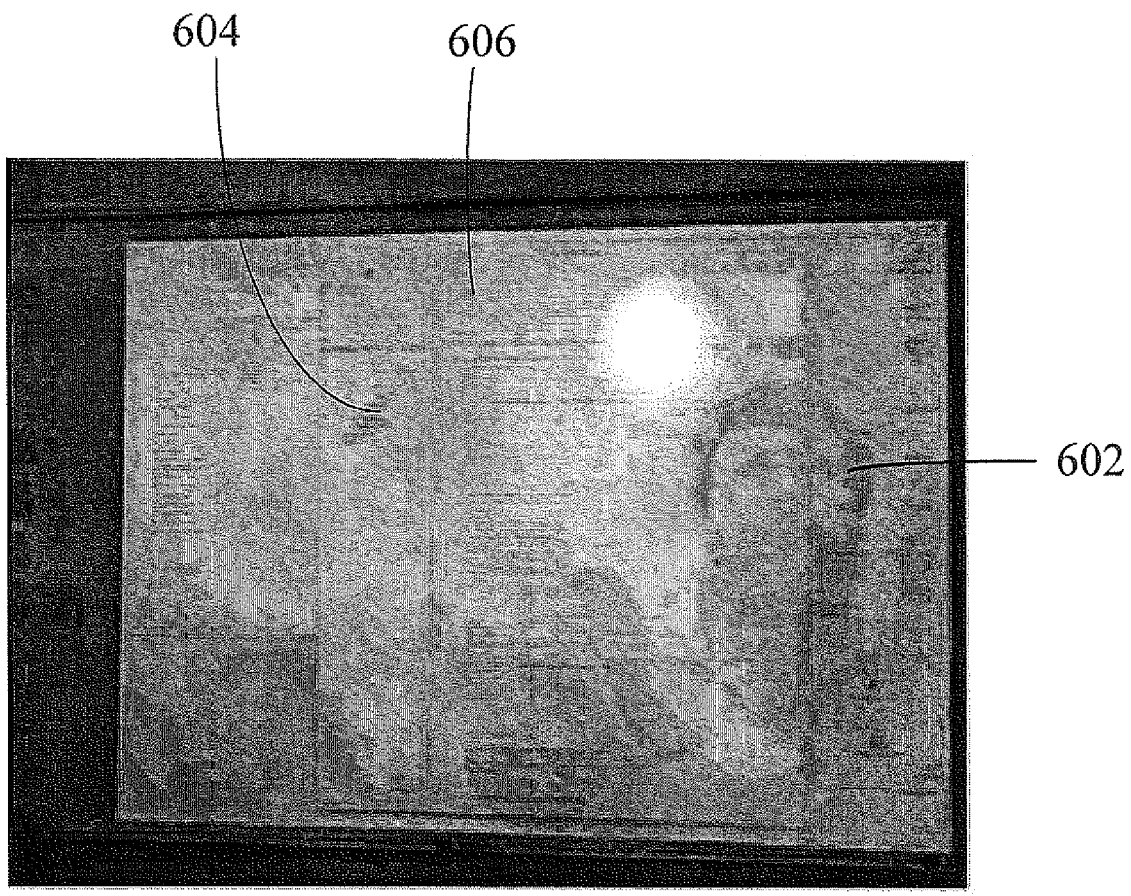
FIG. 6 is a diagram of an exemplary composited image using two input video streams in accordance with the disclosure.

FIG. 6 is a diagram of an exemplary composited image displayed on a user display device showing a collaborative desktop application in accordance with one aspect of the invention. FIG. 6 shows an image 602 of a first user and an image 604 of a second user combined with a computer desktop image 606. The composite image may be produced by combining a video stream of the first and second users and compositing these video streams with the desktop application stream to produce the displayed image. In one implementation, the users may be in different locations. In such an implementation, the video stream for one user may be sent over a network to the computer of the other user. The receiving computer combines the two user's images with the desktop on that computer using the process described above. The composite image may then be transmitted over the network to the remote user's computer where it is displayed. Such as implementation allows remote collaboration, such as distributed programming. The implementation may be extended to n users, where n is any number greater than 2 that the video hardware is capable of supporting.

In FIG. 6, the image is displayed using a projector, although a desktop monitor may be used also. The combined image allows each user to view the common desktop and assist in the collaborative efforts of the users. Each user may gain control of the shared desktop pointer as described above or may control his own pointer.

As previously noted, the methods and systems described herein provide an effective technique for a single user to interact with a personal computer or other computing device. These methods and systems are also effective in applications and devices where two users or more are collaborating on a task or otherwise communicating synchronously.

In one implementation, the composite display described above may be implemented by making the video image of the user transparent and placing the video image of the user on top of the desktop contents to let the desktop contents show through. In an alternate implementation the video image of the user may be placed behind the desktop contents so that the desktop contents are in full view with a faint image of the user under the desktop contents. There may be some applications for which the video image of the user may be composited with other video streams such that portions of some streams may be obscured by the video image of the user and others may obscure portions of the video of the user. Video images may be generated live from a camera or other real-time capture device or may come from a stored video source, such as a movie file or data repository. In one implementation, a live video image of the user may be displayed simultaneously with stored video content, such as a movie, so that the user can interact with the movie.

According to yet another feature of the present disclosure, the level of transparency of the user and/or desktop image may be set dynamically. During use, the user may change the video image from nearly or fully transparent image (where the user's image is not visible or is very faint, to emphasize the desktop contents) to a nearly or fully opaque image (where the user image is dominant and fully or nearly obliterates the desktop contents) to emphasize the video information and communication via the user's image. This dynamic setting may be implemented with explicit interface software controls, such as sliders, buttons, etc., in the windowing software, by hardware devices, or by image recognition of hand, arm, or face motions, or other video image content.

The methods and systems described herein can be applied to personal computer gaming, electronic games on platforms other than a personal computer, such as a game console, arcade platform, game engines running remotely over the Internet or other network, or custom game processes embedded in other products. For example, the video image of a user may be transparently combined with a game display, and the user may be able to control objects in the game display using the methods described herein.

The methods and systems described herein will function with different camera angles and locations other than directly in front of the user. It may be appropriate for different applications or usage contexts to have the camera closer or further away, above or below the level-plane of the user's eyes or at a point distant from the user to accommodate angles that provide better ease of arm motion, pointing, or user interactions.

The methods and systems described herein allow a single user to control a computer operating system without the aid of a traditional pointing device, such as a mouse or trackball. The single user embodiment may be particularly useful when access to a traditional pointing device is not convenient, such as during a presentation in a lecture hall.

The methods and systems described herein also allow multiple users to control a single computer operating system. The methods described may be combined with the networking capabilities of modern personal computers to provide a video stream from remote locations, for example to support teleworking and distance education applications.

Applications of the methods and systems described herein, in addition to those described above, include video conferencing in which multiple users may desire to transparently register their images on the same desktop and/or control the same desktop. Another exemplary application of the methods and systems described herein includes scientific visualization, 3-D graphics models, virtual reality environments, or any other material in which the image displayed is controlled by a mouse pointer. For example, in a virtual reality environment, instead of using a mechanical mouse to navigate through an image, the user may use the tracked video image of the user's finger to navigate the virtual reality environment.

In yet another application, the methods and systems described herein may be used to drive any external devices that can be driven by a computer interface. For example, telescopes include software interfaces that allow the telescopes to be driven to view particular objects. Using the methods and systems described herein, a user may simply point his finger at an object that the user desires the telescope to view and the resulting image of the user's finger may interface with the telescope control software to point the telescope at the particular object.

In yet another application, the methods and systems described herein may implement an all-video desktop. In order to implement an all-video desktop, the methods and systems described herein may be used to track additional objects other than the user's fingers. For example, the user's face, and/or icons on the desktop may be tracked in the video frame.

In yet another application, the methods and systems described herein may be used to facilitate control of a computer by handicapped users. For example, for visually handicapped users, audio signals or tactile feedback may be provided to the user as the pointer is tracked to indicate desktop objects being manipulated by the pointer.

Yet another application for the methods and systems described herein is gesture based web browsing. For example, the application being controlled by one or more users using the methods and systems described herein may be a web browser. Just as a conventional web browser may be controlled using mouse click events, the methods and systems described herein may be used to generate such events and allow users to control web browsers using a convenient interface. In collaborative web browsing, video images of multiple users may be transparently displayed with the same web browser and each user may point to or control interfaces associated with the web browser using the respective users video image. Such an application is particularly important for collaborative research where the research is being performed via Internet web pages.

It will be understood that various details of the present disclosure may be changed without departing from the scope of the present disclosure. Furthermore, the foregoing description is for the purpose of illustration only, and not for the purpose of limitation, as the present disclosure is defined by the claims as set forth hereinafter.

What is claimed is:

1. A method for controlling a computer using at least one video image of a plurality of video images, the method comprising:
   (a) capturing n video streams, n being an integer of at least two, the n video streams each comprising a plurality of video frames and each of the n video streams comprising video of a different user;
   (b) determining a location of an object in at least one of the n video streams;
   (c) controlling a program executing on the computer based on the location of the object;
   (d) combining, at a single computer, the n video streams with a user interface stream generated by a computer operating system, thereby forming a composite video stream;
   (e) providing the composite video stream for display to each of the different users; and
   (f) displaying the composite video stream, wherein displaying the composite video stream includes displaying images of the different users on or behind a desktop interface and allowing the images of the different users to interact with desktop contents.

2. The method of claim 1 wherein capturing n video streams includes receiving a live video signal of a user generated by a video camera.

3. The method of claim 1 wherein capturing n video streams includes receiving a stored video signal from a video storage device.

4. The method of claim 1 wherein determining the location an object in at least one of the n video streams includes:
 (a) searching for a predetermined color in one of the n video streams;
 (b) in response to locating the predetermined color, identifying an occurrence of the predetermined color having the largest area; and
 (c) determining coordinates of the center of the occurrence of the predetermined color having the largest area.

5. The method of claim 1 wherein controlling a program executing on the computer based on the location of the object comprises:
 (a) analyzing motion of the object in successive video frames to determine presence of a control event; and
 (b) controlling the program based on the control event.

6. The method of claim 5 wherein each of the n video streams comprises an image of a different computer user, the object comprises an object associated with the user's hand, and the control event comprises a pointer movement event.

7. The method of claim 5 wherein each of the n video streams comprises an image of a different computer user, the object comprises an object located in the user's hand, and the control event comprises a mouse click event.

8. The method of claim 1 wherein combining the n video streams with the user interface stream generated by the computer operating system includes horizontally reversing frames of the n video streams to produce a mirror image of the frames of the n video streams.

9. The method of claim 1 wherein combining the n video streams with the user interface stream generated by the computer operating system includes transparently overlaying the user interface stream on the n video streams.

10. The method of claim 1 wherein combining the n video streams with the user interface stream generated by the computer operating system includes transparently overlaying the n video streams on the user interface stream.

11. The method of claim 1 wherein combining the n video streams with the user interface stream generated by the computer operating system includes:
 (a) adjusting a transparency level of at least one of the user interface stream and the n video streams; and
 (b) generating the composite stream from the user interface stream and the n video streams.

12. The method of claim 11 wherein adjusting the transparency level includes dynamically adjusting the transparency level.

13. The method of claim 1 wherein displaying the composite video stream includes projecting the composite video stream.

14. The method of claim 1 wherein the program comprises a collaborative desktop application.

15. The method of claim 14 wherein the collaborative desktop application allows each user to control his or her own mouse pointer on a shared desktop.

16. The method of claim 1 wherein at least some of the users are in different locations and wherein the program comprises a distributed computer programming application.

17. A method for combining a plurality of video images, each containing an image of a user, with a computer desktop interface, the method comprising:
 (a) capturing n video streams, n being an integer of at least two, each video stream comprising a plurality of frames and each video stream comprising video of a different user;
 (b) transparently combining, at a single computer, the n video streams with a computer desktop generated by a computer operating system, thereby forming a composite video stream;
 (c) providing the composite video stream for display to each of the different users; and
 (d) displaying the composite video stream, wherein the composite image includes transparent images of the users displayed with the computer desktop, wherein displaying the composite video stream includes displaying images of the different users on or behind the computer desktop and allowing the images of the different users to interact with desktop contents.

18. The method of claim 17 wherein capturing the n video streams includes receiving a live video signal generated by a video camera.

19. The method of claim 17 wherein combining the n video streams with the user interface stream generated by the computer operating system includes horizontally reversing frames of the n video streams to produce a mirror image of the frames of the n video streams.

20. The method of claim 17 wherein combining the n video streams with the user interface stream generated by the computer operating system includes:
 (a) adjusting a transparency level of at least one of the user interface stream and the n video streams; and
 (b) generating the composite stream from the user interface stream and the n video streams.

21. The method of claim 20 wherein adjusting the transparency level includes dynamically adjusting the transparency level.

22. The method of claim 17 wherein displaying the composite video stream includes projecting the composite video stream.

23. The method of claim 17 wherein displaying the composite video stream includes displaying the composite video stream on a non-projection computer display device.

24. The method of claim 17 wherein displaying the composite video stream includes displaying a mirror image of each user with the desktop.

25. The method of claim 17 comprising controlling objects on the desktop in response to movement of at least one of the user images.

26. The method of claim 25 wherein controlling objects on the desktop includes moving objects on the desktop.

27. The method of claim 25 wherein controlling objects on the desktop includes activating programs associated with objects on the desktop.

28. The method of claim 17 wherein the desktop comprises the desktop of a computer local to at least one of the users.

29. The method of claim 17 wherein the desktop comprises the desktop of a computer remote from at least one of the users.

30. The method of claim 17 wherein each of the plurality of video streams includes an image of a different user.

31. The method of claim 30 comprising controlling desktop objects in response to movement of user images in any of the video streams.

32. The method of claim 30 wherein the different users comprise collaborators in distributed computer programming task.

33. A computer-readable medium having stored thereon a set of computer-executable instructions, the set of instructions comprising:
 (a) n video stream capturing routines, n being an integer of at least two, each of the video stream capturing routines for capturing a different video stream, each video stream comprising a plurality of video frames and each video stream comprising an image of a different user;

(b) a video frame analysis routine for determining a location of an object in at least some of the plurality of video frames;

(c) a driver for controlling a program executing on the computer based on the location of the object;

(d) a video compositing routine for combining, at a single computer, the n video streams with a user interface stream generated by a computer operating system, thereby forming a composite video stream and for providing the composite video stream for display to each of the n users; and (e) a video display routine for displaying the composite video stream, wherein displaying the composite video stream includes displaying images of the different users on or behind a desktop interface and allowing the images of the different users to interact with desktop contents.

34. The computer-readable medium of claim 33 wherein the user interface driving routine comprises:

(a) instructions for searching for a predetermined color in at least one of the n video streams;

(b) instructions for identifying an occurrence of the predetermined color having a largest area; and (c) instructions for determining the coordinates of the center of the occurrence of the predetermined color having the largest area.

35. The computer-readable medium of claim 33 wherein the video compositing routine comprises:

(a) instructions for adjusting the transparency level of at least one of the user interface stream and the n video streams; and (b) instructions for generating the composite stream from the user interface stream and the n video streams.

36. The computer-readable medium of claim 33 wherein the video compositing routine comprises instructions for horizontally reversing images of the n video streams to produce a mirror image of the images of the n video streams.

37. The computer-readable medium of claim 33 wherein each of the n video streams comprises an image of a different user.

38. A computer readable medium having stored thereon computer-executable instructions for performing steps comprising:

(a) receiving n video images, n being an integer of at least two, each video image including video of a different computer user;

(b) combining, at a single computer, the n video images with a computer desktop image;

(c) providing the combined image for display to each of the different users;

(d) displaying the combined image, wherein displaying the combined image includes displaying images of the different users on or behind the desktop image and allowing the images of the different users to interact with desktop contents;

(e) tracking a portion of at least one of the n video images in the combined image; and (f) manipulating objects in the desktop image based on the tracked portion.

39. The computer readable medium of claim 38 wherein manipulating objects includes highlighting the objects.

40. The computer readable medium of claim 38 wherein manipulating objects includes moving the objects.

41. The computer readable medium of claim 38 wherein manipulating objects includes activating programs associated with the objects.

42. The computer readable medium of claim 38 wherein each video image includes an image of a different user.

43. A computer system comprising:

(a) a display device;

(b) n video cameras for producing n video streams, n being an integer of at least two, each video stream including video of a different user; and (c) a processing unit operatively coupled to the display device and the n video cameras, wherein the processing unit is adapted to:

(i) receive the n video streams, combine the n video streams into a composite video stream including the video of the different users and provide the composite video stream for display to the different users, wherein displaying the composite video stream includes displaying images of the different users on or behind a desktop interface and allowing the images of the different users to interact with desktop contents;

(ii) determine a location of a predetermined object associated with a user in at least one of the plurality of video frames; and (iii) control execution of a program based on the location of the object.

44. The system of claim 43 wherein the n video cameras are each positioned to produce a video stream including an image of a different user.

45. The system of claim 44 wherein the different users comprise collaborators in a distributed computer programming task.

46. The computer-readable medium of claim 37 wherein at least some of the users are in different locations.

47. The computer-readable medium of claim 46 wherein the different users comprise collaborators in a distributed computer programming task.

48. The computer readable medium of claim 42 wherein the different users comprise collaborators in a distributed computer programming task.

* * * * *